US007664010B2

(12) United States Patent
Kowalski et al.

(10) Patent No.: US 7,664,010 B2
(45) Date of Patent: Feb. 16, 2010

(54) SYSTEMS AND METHODS FOR COMBINING REFERENCE AND DATA SIGNALS TO REDUCE PEAK TO AVERAGE POWER RATIO FOR COHERENT COMMUNICATION SYSTEMS

(75) Inventors: John M. Kowalski, Camas, WA (US); Huaming Wu, Vancouver, WA (US); Lizhong Zheng, Canton, MA (US)

(73) Assignee: Sharp Laboratories of America, Inc., Camas, WA (US)

( * ) Notice: Subject to any disclaimer, the term of this patent is extended or adjusted under 35 U.S.C. 154(b) by 525 days.

(21) Appl. No.: 11/534,180

(22) Filed: Sep. 21, 2006

(65) Prior Publication Data

US 2008/0074990 A1  Mar. 27, 2008

(51) Int. Cl.
*H04J 11/00* (2006.01)
(52) U.S. Cl. ...................... 370/208; 375/260
(58) Field of Classification Search ............ 370/203, 370/204, 208, 210; 375/260, 261, 295
See application file for complete search history.

(56) References Cited

U.S. PATENT DOCUMENTS

| 2005/0063327 | A1* | 3/2005 | Krauss et al. | 370/320 |
| 2006/0034390 | A1* | 2/2006 | Vummintala et al. | 375/299 |
| 2006/0133260 | A1* | 6/2006 | Kim et al. | 370/208 |
| 2006/0158376 | A1 | 7/2006 | Kaneko | |
| 2006/0159188 | A1 | 7/2006 | Izumi | |
| 2006/0160545 | A1 | 7/2006 | Goren et al. | |
| 2006/0176093 | A1* | 8/2006 | Song et al. | 327/179 |
| 2006/0268676 | A1* | 11/2006 | Gore et al. | 370/210 |
| 2008/0317141 | A1* | 12/2008 | Burg et al. | 375/260 |
| 2009/0103645 | A1* | 4/2009 | Jitsukawa et al. | 375/260 |

OTHER PUBLICATIONS

Daniels et al., Null Space, Aug. 4, 2005, Version 2.9, pp. 1-2.*
"Superimposed Training On Redundant Precoding For Low-Complexity Recovery Of Block Transmissions," Ohno et al., Proc. IEEE International Conf. Commun., vol. 5, Helsinki, Finland, Jun. 2001, pp. 1501-1505.
"Optimal Peak-to-Average Power Ratio Reduction in MIMO-OFDM Systems," Aggarwal et. al., ICC 2006.
"Channel Estimation with Superimposed Pilot Sequence," Hoeher et al., Proc. IEEE GlobeCom, 1999. pp. 2162-2166.
"Superimposed training for doubly selective channels," Zhou et al., Proc. IEEE Statistical Signal Processing Workshop, St. Louis, MO, Sep. 2003, pp. 82-85.

* cited by examiner

*Primary Examiner*—Ricky Ngo
*Assistant Examiner*—Kan Yuen
(74) *Attorney, Agent, or Firm*—Austin Rapp & Hardman (57) ABSTRACT

A method for combining a reference signal with a data signal is disclosed. A multiplexed data signal is received. A demultiplexer is applied to the data signal. The data signal is encoded. A linear transformation is applied to the data signal which projects the data signal into a null-space of a plurality of reference signals. The encoded data signal is summed with the reference signal. The summation of the data signal and the reference signal is orthogonally modulated. The combined reference signal and data signal is transmitted to a receiver.

21 Claims, 9 Drawing Sheets

SYSTEMS AND METHODS FOR COMBINING REFERENCE AND DATA SIGNALS TO REDUCE PEAK TO AVERAGE POWER RATIO FOR COHERENT COMMUNICATION SYSTEMS

TECHNICAL FIELD

The present invention relates generally to communication systems and communication systems-related technology. More specifically, the present invention relates to combining reference and data signals to reduce peak to average power ratio for coherent communication systems.

BACKGROUND

A wireless communication system typically includes a base station in wireless communication with a plurality of user devices (which may also be referred to as mobile stations, subscriber units, access terminals, etc.). The base station transmits data to the user devices over a radio frequency (RF) communication channel. The term "downlink" refers to transmission from a base station to a user device, while the term "uplink" refers to transmission from a user device to a base station.

Orthogonal frequency division multiplexing (OFDM) is a modulation and multiple-access technique whereby the transmission band of a communication channel is divided into a number of equally spaced sub-bands. A sub-carrier carrying a portion of the user information is transmitted in each sub-band, and every sub-carrier is orthogonal with every other sub-carrier. Sub-carriers are sometimes referred to as "tones." OFDM enables the creation of a very flexible system architecture that can be used efficiently for a wide range of services, including voice and data. OFDM is sometimes referred to as discrete multitone transmission (DMT).

The 3rd Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering OFDM as well as OFDM/OQAM (Orthogonal Frequency Division Multiplexing/Offset Quadrature Amplitude Modulation), as a method for downlink transmission, as well as OFDM transmission on the uplink.

The proposed OFDM-based modulation schemes, both on the uplink and the downlink, would require a relatively high peak to average power ratio (PAPR). This is because the amplitude of an OFDM signal is the summation of the amplitudes of the respective sub-carriers. As a result, the amplitude of an OFDM signal may change quite significantly. When a modulated signal with a high PAPR passes through an RF processing unit, the signal may be distorted due to the non-linearity of a regular RF amplifier.

Reducing the PAPR may reduce the distortion of the signal. A high PAPR of OFDM systems introduces inevitable non-linear distortion in the transmitter and reduces the performance dramatically. The high PAPR also demands a very linear transmission and blocks the practical deployment of low-cost low power OFDM systems. As such, benefits may be realized by providing systems and methods to reduce the PAPR in communication systems.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A method for combining a reference signal with a data signal is disclosed. A multiplexed data signal is received. A demultiplexer is applied to the data signal. The data signal is encoded. A linear transformation is applied to the data signal which projects the data signal into a null-space of a plurality of reference signals. The encoded data signal is summed with the reference signal. The summation of the data signal and the reference signal is orthogonally modulated. The combined reference signal and data signal is transmitted to a receiver.

In one embodiment, the reference signal is selected based on a solution of a constrained optimization problem. The combined signal may be transmitted with a single antenna. The combined signal may be transmitted with a multiple-input multiple-output antenna system.

In one embodiment, the optimal reference signal may be approximated by optimizing over a particular class of matrices that multiplex the data signal and reference signal into each other. The transmitted average power required to maintain the same symbol error characteristics may be preserved.

In one embodiment, the reference signal may be estimated. In another embodiment, the data signal may be demodulated. A class of receivers may be included. In one embodiment, orthogonal frequency-division multiplexing (OFDM) may be implemented. In another embodiment, discrete Fourier transform (DFT)-Spread OFDM may be implemented. A multi carrier system may also be implemented. The reference signal amongst multiple carriers may be aggregated. In one embodiment, tone reservation in the multiple carrier system may be employed.

A communications system that is configured to implement a method for combining a reference signal with a data signal is also disclosed. A processor and memory in electronic communication with the processor is disclosed. A multiplexed data signal is received. A demultiplexer is applied to the data signal. The data signal is encoded. A linear transform is applied to the data signal which projects the data signal into a null-space of a plurality of reference signals. The encoded data signal is summed with the reference signal. The summation of the data signal and the reference signal is modulated orthogonally. The combined reference signal and data signal is transmitted to a receiver.

A computer-readable medium comprising executable instructions for implementing a method for combining a reference signal with a data signal is also disclosed. A multiplexed data signal is received. A demultiplexer is applied to the data signal. The data signal is encoded. A linear transform is applied to the data signal which projects the data signal into a null-space of a plurality of reference signals. The encoded data signal is summed with the reference signal. The summation of the data signal and the reference signal is modulated orthogonally. The combined reference signal and the data signal is transmitted to a receiver.

A method for receiving a combined reference and data signal is also disclosed. The combined reference and data signal is received. A summation of the combined reference and data signal is demodulated. A linear transform is applied to the combined signal. The reference signal is separated from the data signal. An estimation of the reference signal is calculated.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment, "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

A number of techniques have been implemented to reduce the peak to average power ratio in OFDM systems. An example technique which may serve to reduce the peak to average power ratio is the combining of reference signals with data signals. With a combined signal, both the reference signal and the data signal are sent contemporaneously to the receiver. Sending a combined signal may reduce the PAPR of OFDM signals. The present systems and methods relate to the issue of combining the reference signal with the data signal at the transmitter and separating the reference signal from the data signal at the receiver.

A transmitter may transmit a vector signal of the form x(t), where at any time $x(t) \in \mathcal{C}^{m_T}$, the Hilbert space of complex m-dimensional vectors, transmitted over a multiple antenna system which is received by a receiver as:

$$y(t)=Hx(t)+w(t) \quad (1)$$

where H may be an $m_R \times m_T$ complex channel matrix $\in \mathcal{C}^{m_R \times m_T}$, and w may be an $m_R$ dimensional additive white Gaussian noise (AWGN) vector whose elements may be independent and identically distributed (i.i.d.), and whose sample values may include $\in \mathcal{C}^{m_R}$. The channel matrix may result from a block-fading law, where the channel may be constant for some discrete time interval T, after which it may change to an independent value for the next interval of duration T, etc. Data may be sent for $T_d$ discrete time instants as $x^{(d)}(t)$, and in addition data may be sent for $T_p$ time instants as $x^{(p)}(t)$. In one embodiment, $T=T_d+T_p$, and the receiver may be implemented to compute and utilize channel estimates. The vectors $x^{(d)}(t)$ and $x^{(p)}(t)$ may be sent at different powers/energies per unit time. The total energy may be represented as $rT=r_dT_d$. In one embodiment, resources devoted to training may be functions of energy.

When the receiver computes the estimation of the channel, a minimum mean square estimate (MMSE) $\hat{H}$ of H, may be computed. The variance of the estimation error (i.e., trace of covariance matrix from equation (1)) is $$\frac{1}{(\|x^{(p)}(t)\|^2 + 1)},$$

with the variance of the noise normalized to unity. The optimal training energy, as a function of total energy, based on assumptions of additive i.i.d. noise, may be expressed as:

$$E_{opt} = \begin{cases} 1 - \left(\gamma - \sqrt{\gamma(\gamma-1)}\right) & \text{for } T_d < m_T \\ 1/2 & \text{for } T_d = m_T \\ 1 - \left(\gamma + \sqrt{\gamma(\gamma-1)}\right) & \text{for } T_d < m_T \end{cases} \quad (2)$$

where $\gamma = \dfrac{m_T + \rho T}{\rho T\left(1 - \dfrac{m_T}{T_d}\right)},$ where ρ is the overall SNR, and so that the energy is given by ρT, and the energy due to the data and pilot respectively would be given by $\rho_d T_d$ and $\rho_p T_p$. Further, as shown in equation (3) (provided below), if the transmit power of the training and the data are allowed to vary, the optimal training may be as short as possible (with $T_p = m_T$).

Several factors generally prevent the implementation of such systems described above. Typically, the transmitted peak-to-average power ratio (PAPR) may need to be minimized to conserve energy of the transmitter, which is often battery operated. Also, the transmitter may need to meet certain spectral mask requirements imposed by national regulatory bodies. The use of training samples may imply that $m_T$ degrees of freedom are unused to transmit channel information, but rather to determine the channel characteristics.

One possible way this may be achieved is to send the data and pilot signals together over the period of time T, so that $x(t)=x^{(d)}(t)+x^{(p)}(t)$ for $t \in [kT, (k+1)T)$. In one embodiment, a single antenna communication system includes a pilot signal and a multiple antenna communication system includes reference signals. This possibility may include imposing the condition that $$\int_{kT}^{(k+1)T} x^{(d)}(t)dt = 0.$$

In a communication system implementing code division multiple access (CDMA) a separate orthogonal CDMA code may be used as a pilot signal. Were this concept extended to multiple-input multiple-output (MIMO) communications, reference signals may be used with the property $$\int_{kT}^{(k+1)T} x_j^{(d)}(t)x_k^{*(p)}(t)dt = 0, \, j, k = 1 \ldots m_T.$$

However, this may imply $m_T$ degrees of freedom may still be allocated to the pilot signal. As such, a representation of $x^{(p)}(t)$ may be defined such that at most $m_T$ time symbols are used which may allow accurate estimation of the channel process at the receiver and may meet peak-to-average power constraints and spectral mask constraints.

Figure 1:
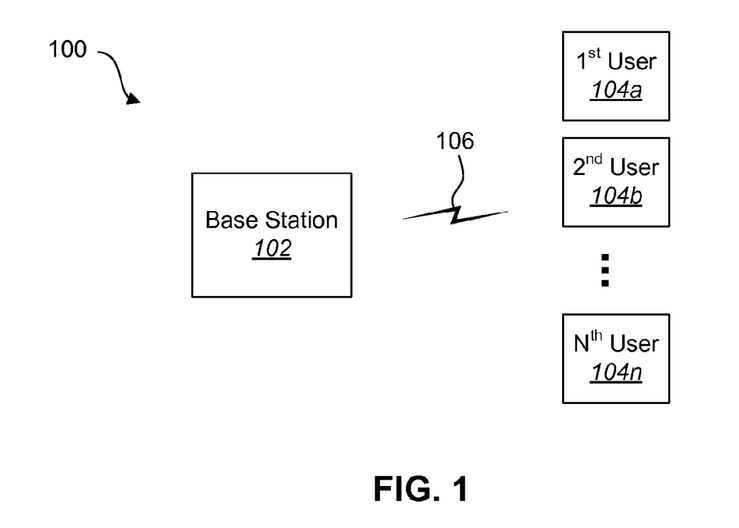
FIG. 1 illustrates an exemplary wireless communication system in which embodiments may be practiced.

FIG. 1 illustrates an exemplary wireless communication system 100 in which embodiments may be practiced. A base station 102 is in wireless communication with a plurality of user devices 104 (which, as indicated above, may also be referred to as mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106.

As used herein, the term "OFDM transmitter" refers to any component or device that transmits OFDM signals. An OFDM transmitter may be implemented in a base station 102 that transmits OFDM signals to one or more user devices 104. Alternatively, an OFDM transmitter may be implemented in a user device 104 that transmits OFDM signals to one or more base stations 102.

The term "OFDM receiver" refers to any component or device that receives OFDM signals. An OFDM receiver may be implemented in a user device 104 that receives OFDM signals from one or more base stations 102. Alternatively, an OFDM receiver may be implemented in a base station 102 that receives OFDM signals from one or more user devices 104.

Figure 2:
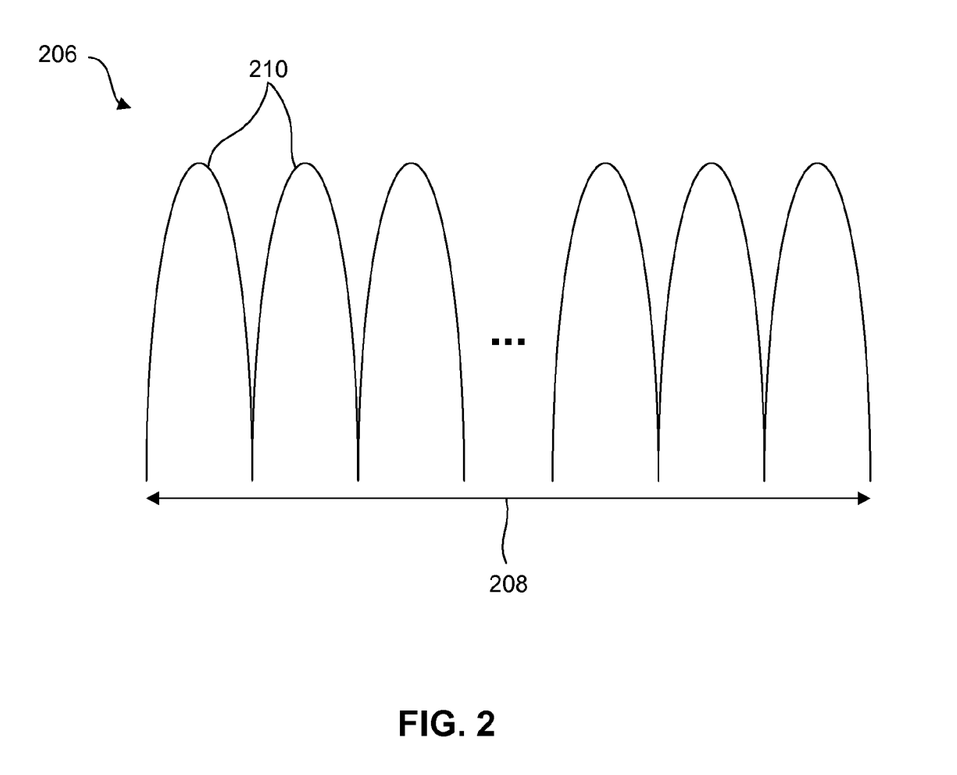
FIG. 2 illustrates some characteristics of a transmission band of an RF communication channel in accordance with an OFDM-based system.

FIG. 2 illustrates some characteristics of a transmission band 208 of an RF communication channel 206 in accordance with an OFDM-based system. As shown, the transmission band 208 may be divided into a number of equally spaced sub-bands 210. As mentioned above, a sub-carrier carrying a portion of the user information is transmitted in each sub-band 210, and every sub-carrier is orthogonal with every other sub-carrier.

Figure 3:
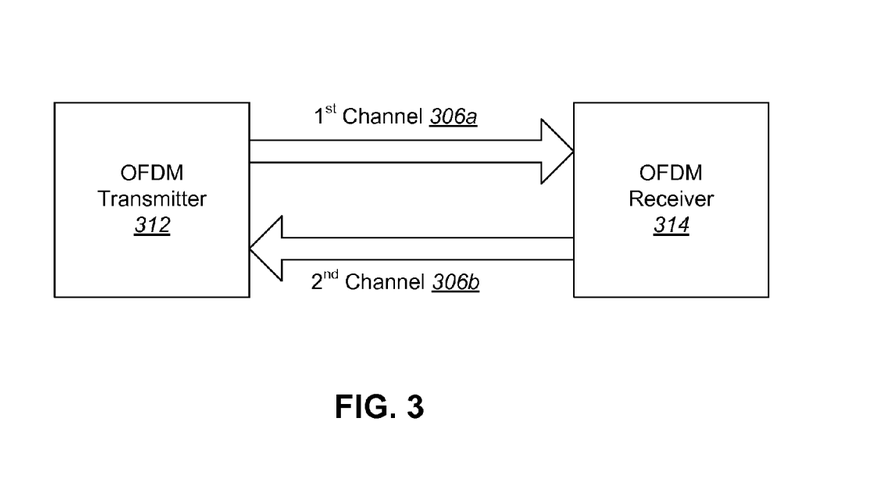
FIG. 3 illustrates communication channels that may exist between an OFDM transmitter and an OFDM receiver according to an embodiment.

FIG. 3 illustrates communication channels 306 that may exist between an OFDM transmitter 312 and an OFDM receiver 314 according to an embodiment. As shown, communication from the OFDM transmitter 312 to the OFDM receiver 314 may occur over a first communication channel 306a. Communication from the OFDM receiver 314 to the OFDM transmitter 312 may occur over a second communication channel 306b.

The first communication channel 306a and the second communication channel 306b may be separate communication channels 306. For example, there may be no overlap between the transmission band of the first communication channel 306a and the transmission band of the second communication channel 306b.

Figure 4A:
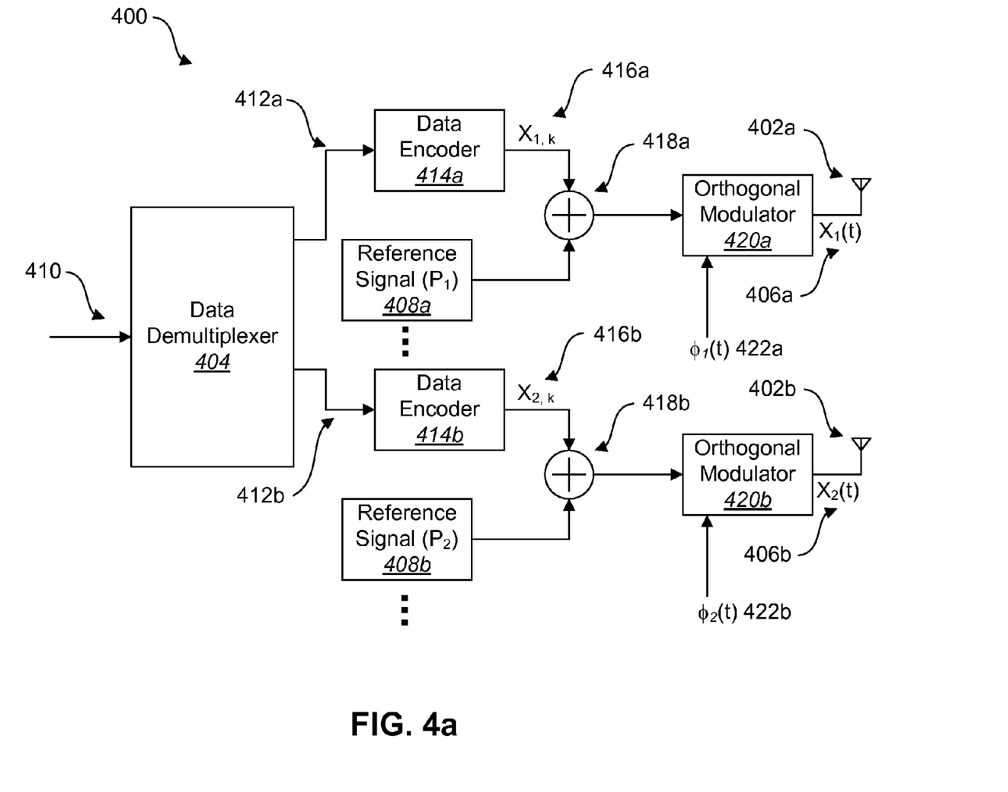
FIG. 4a illustrates a block diagram of one embodiment of a transmitter which may transmit data signals to a receiver.

FIG. 4a is a block diagram illustrating one embodiment of a transmitter 400 in which two antennas 402a and 402b are used to transmit two data signals $x_1(t)$ 406a and $x_2(t)$ 406b simultaneously with two reference signals $P_1$ 408a and $P_2$ 408b using an orthogonal modulation. Some embodiments of the transmitter 400 may include a single antenna. In other embodiments, the transmitter 400 may include multiple antennas.

The transmitter 400 may include a data demultiplexer 404 which serves to receive a single data signal 410 and then split the single data signal 410 into multiple signals 412a and 412b. The multiple signals 412a, 412b may be encoded by a data encoder 414a, 414b which serves to change a signal or data into code. The output of each data encoder 414a, 414b may be referred to as $x_{1,k}$ 416a and $x_{2,k}$ 416b. A summation function 418a, 418b may sum the output of the data encoders 414a, 414b with the reference signals 408a, 408b. An orthogonal modulator 420a, 420b may modulate the summed signals with orthogonal functions $\phi_1(t)$ 422a and $\phi_2(t)$ 422b. The transmitter antennas 402a, 402b may transmit the modulated signals to a receiver. An explanation of a superposition of reference signals onto data for multiple antenna transmission from the transmitter 400 is now provided.

In transmitting a signal in a band of interval $$\left[\frac{-W}{2}, \frac{W}{2}\right)$$

in duration of T, WT orthogonal waveforms may be transmitted. Following equation (3) (provided below), with $m_T$ transmit antennas, that there is a coherence time of T symbols available, to be allocated amongst pilot and data symbols. If an orthogonal waveform may be transmitted in one of these symbols times (denoted as $T_s$, such that $T=KT_s$, in bandwidth W), then there may be (with $m_T=m_R=m$ antennas) up to mWK orthogonal waveforms that may be transmitted in time T, if the multiple antenna channels truly behave as independent channels.

In one embodiment, the summation function 418 may yield $(P_1+x_{1,k})$ which may be modulated by the orthogonal modulator 420a. $(P_1+x_{1,k})$ may be modulated by the orthogonal function $\phi_1(t)$ 422a, in time $[(k-1)T_s, kT_s)$. In other words $x_1(t)=(P_1+x_{1,k})\phi_1(t)$, and $$\int_{(k-1)T_s}^{kT_s} \phi_1(t)\phi_2^*(t)dt = 0$$

so that at a receiver, a correlation may be performed with the appropriate orthogonal function $\phi_1(t)$ 422a which may yield an estimate of $(P_1+x_{1,k})$. The estimate of $(P_1+x_{1,k})$ may include additive noise.

An added requirement that $$\int_T \sum_\kappa \chi_{l\kappa} P(t-\kappa T_s)d\tau = 0$$

may indicate that the number of orthogonal signals transmitted over any given antenna may be two. Further, the number of reference signals transmitted may also be two. The above mentioned example provides the same occupancy of degrees of freedom as with the Hassibi and Hochwald states. In one embodiment, these degrees of freedom may come from the orthogonal modulation. In particular, if an OFDM modulation is implemented, then the reference signal $P_1$ 408a occupies the 0 Hz carrier position of the modulation.

Figure 4B:
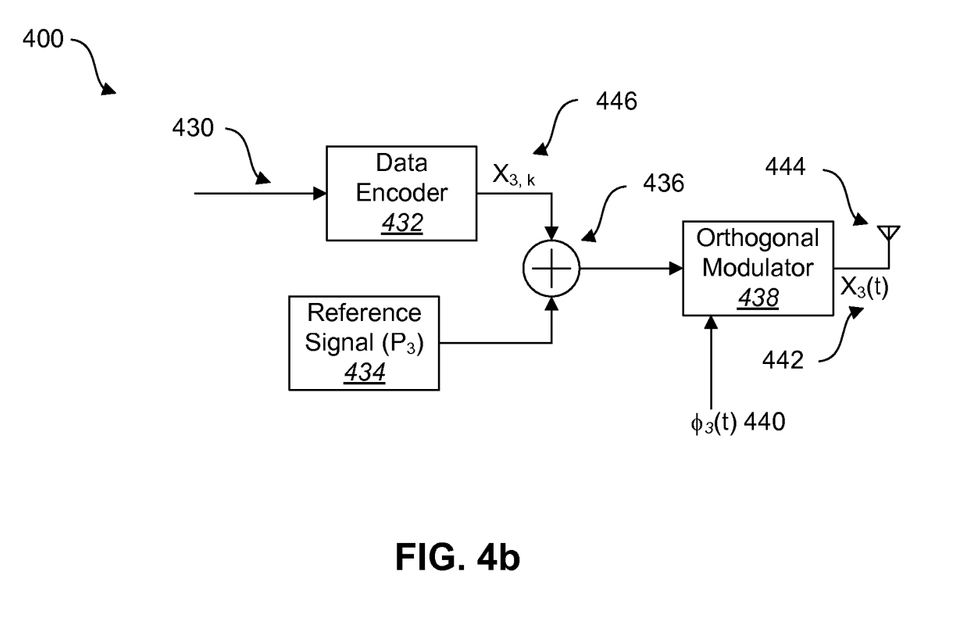
FIG. 4b illustrates a block diagram of another embodiment of a transmitter which may transmit data signals to a receiver.

FIG. 4b is a block diagram illustrating one embodiment of a transmitter 400 in which a single transmitter antenna 444 is used to transmit a data signal $x_3(t)$ 442 simultaneously with a reference signal $P_3$ 434 using an orthogonal modulation.

A signal 430 may be encoded by a data encoder 432 which serves to change a signal or data into code. The output of the data encoder 432 may be referred to as $x_{3,k}$ 446. A summation function 436 may sum the output of the data encoder 432 with the reference signal 434. An orthogonal modulator 438 may modulate the summed signals with orthogonal functions $\phi_3(t)$ 440. The transmitter antenna 444 may transmit the modulated signal to a receiver.

Figure 5:
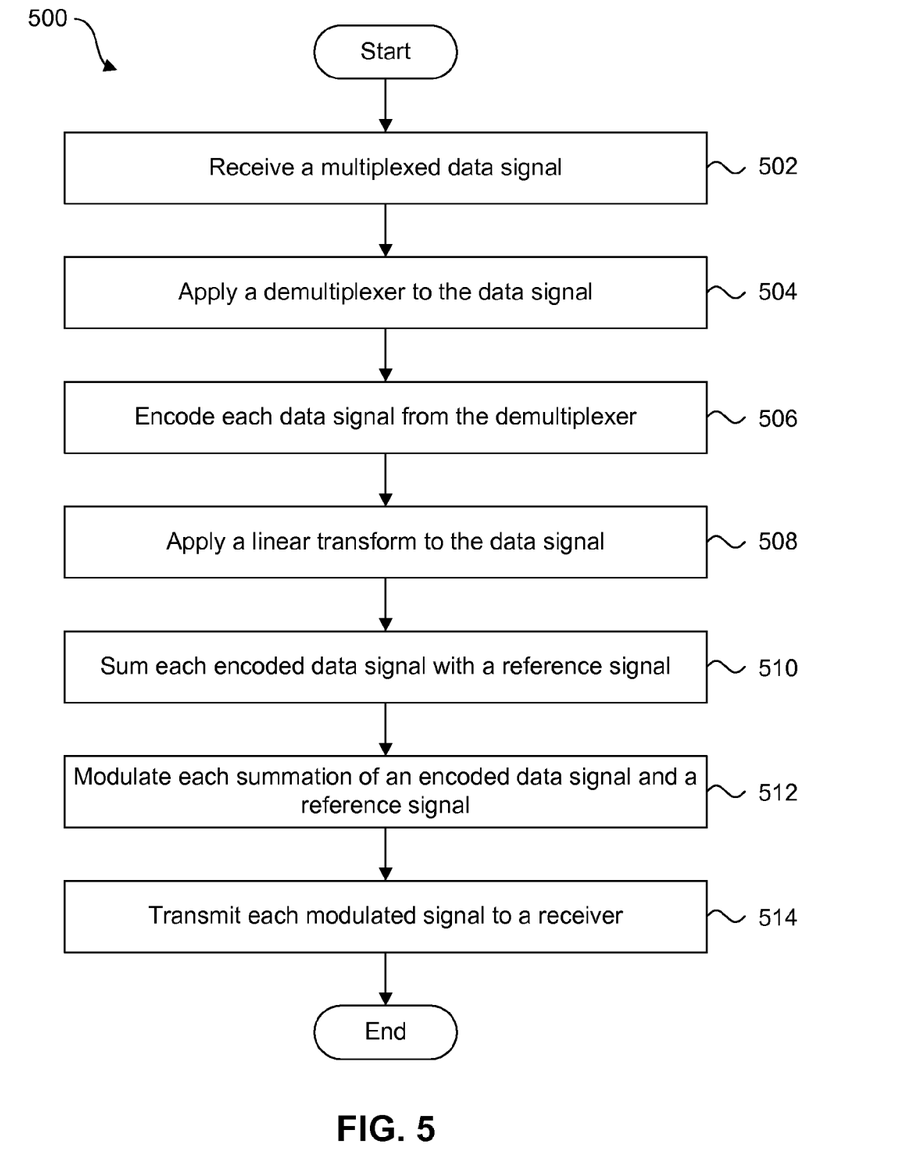
FIG. 5 is a flow diagram illustrating one embodiment of a method of transmitting data signals to the receiver.

FIG. 5 is a flow diagram illustrating one embodiment of a method 500 to transmit data. In one embodiment, the transmitter 400 may implement the method 500. The method 500 begins and the transmitter 400 receives 502 a multiplexed data signal. The transmitter 400 may apply 504 a demultiplexer 404 to the data signal. In one embodiment, the demultiplexer 404 may be applied 504 to the data signal in order to split the multiplexed data signal into multiple data signals as previously explained.

After the demultiplexer 404 has been applied 504 to separate the data signal, each individual data signal may be encoded 506. In one embodiment, a linear transformation may be applied 508 to the data signal which may project the data signal in a null-space of a plurality of reference signals. In one embodiment, the null-space is a set of all vectors such that when they are multiplied by a matrix, the zero vector is the result. The method 500 continues and each encoded data signal may be summed 510 together with a reference signal. The summation of each encoded data signal and reference signal may then be modulated 512. In one embodiment, the orthogonal modulator 420a modulates the summation as previously explained. The method 500 continues and the transmitter 400 transmits 514 each modulated signal including both the data signal and the reference signal to a receiver.

Figure 6:
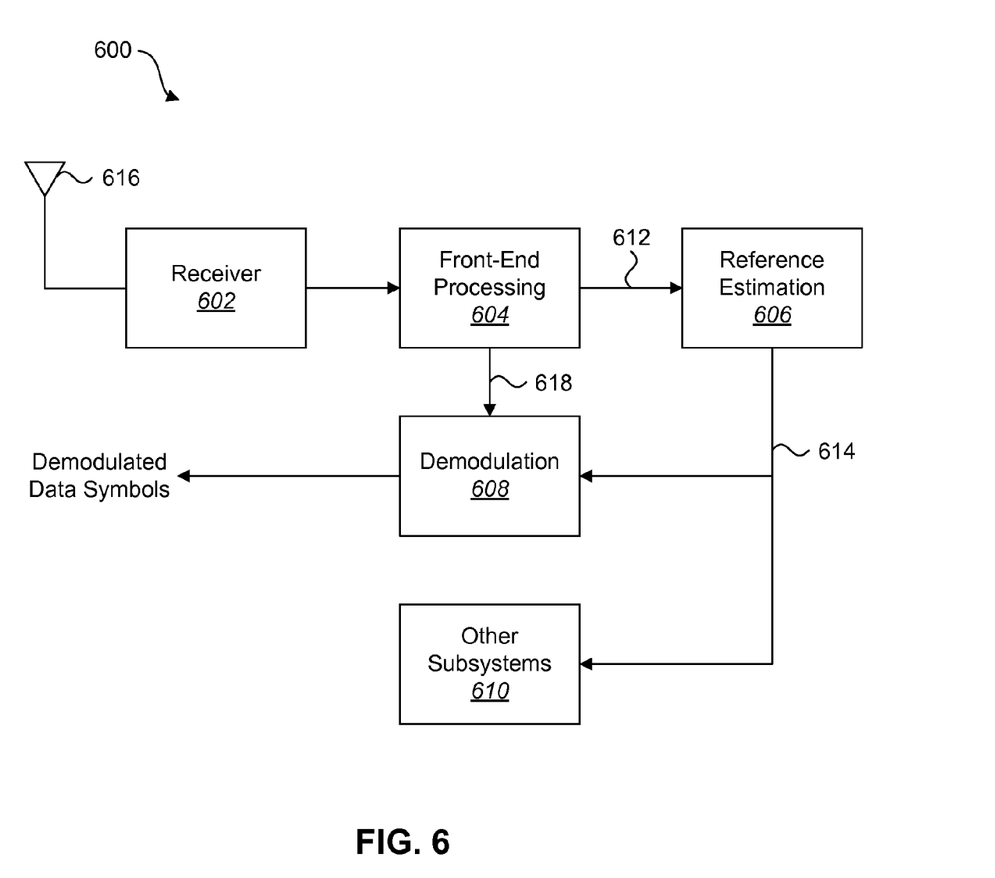
FIG. 6 illustrates a block diagram of one embodiment of the receiver which may receive data signals from the transmitter.

FIG. 6 illustrates a block diagram 600 of certain components in an embodiment of a receiver 602. Other components that are typically included in the receiver 602 may not be illustrated for the purpose of focusing on the novel features of the embodiments herein.

A signal may be received at an antenna 616. In one embodiment, the signal includes both the reference signal and the data sent from the transmitter 400. The signal is provided by the antenna 616 to the receiver 602. The receiver 602 downconverts the signal and provides it to a front-end processing component 604. The front-end processing component 604 may separate the reference signal from the data signal. The front-end processing component 604 may provide the received reference signal 612 to a reference estimation component 606. The received reference signal 612 typically includes noise and usually suffers from fading. The front-end processing component 604 may also provide the data 618 to a demodulation component 608 that demodulates the data signal.

The reference estimation component 606 may provide an estimated reference signal 614 to the demodulation component 608. The reference estimation component 606 may also provide the estimated reference signal 614 to other subsystems 610.

Additional processing takes place at the receiver 602. Generally, the reference estimation component 606 operates to estimate the reference signal and effectively clean-up the reference signal by reducing the noise and estimating the original reference (sometimes referred to as pilot) signal that was transmitted.

Figure 7:
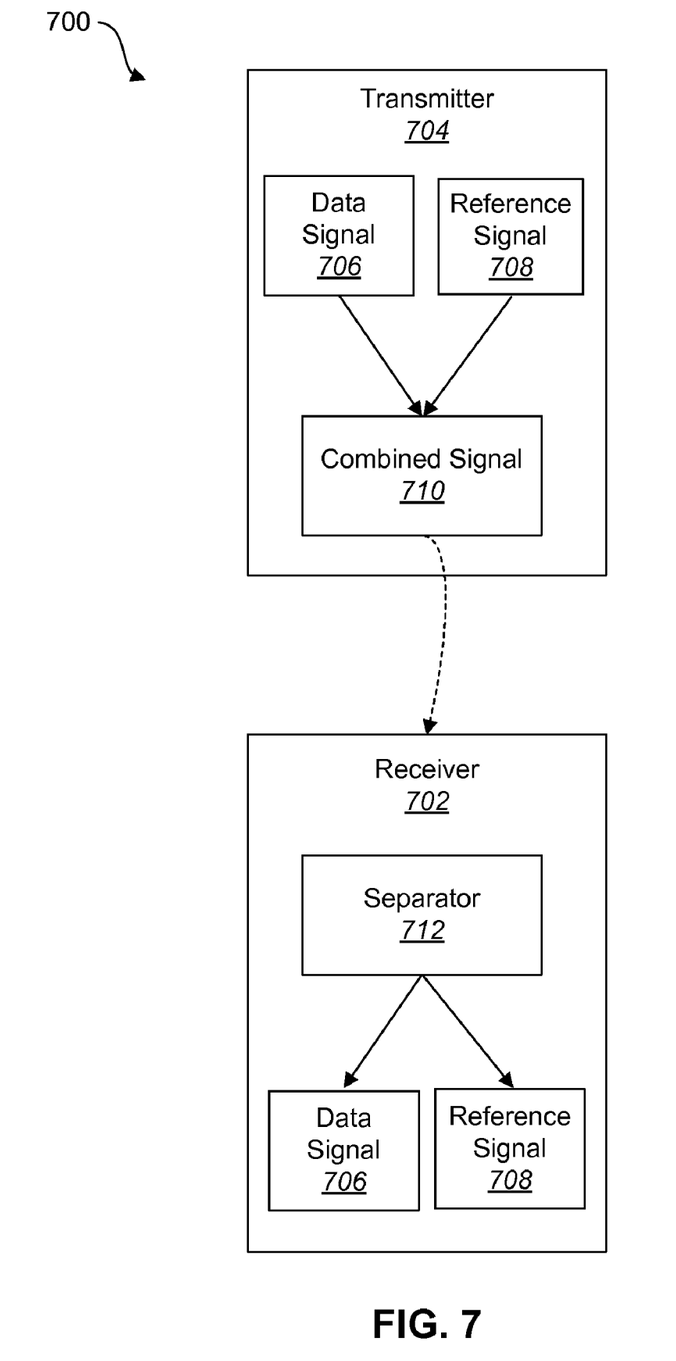
FIG. 7 is a block diagram illustrating one embodiment of the transmitter transmitting a combined signal to the receiver.

FIG. 7 is a block diagram 700 illustrating an embodiment of the transmitter 704 and the receiver 702. In one embodiment, the transmitter 704 may include a data signal 706 and a reference signal 708. The data signal 706 and the reference signal 708 may be combined into a single combined signal 710. The transmitter 704 may further transmit the combined signal 710 to the receiver 702. The receiver 702 may include a separator 712 which serves to separate the data signal 706 from the reference signal 708.

Figure 8:
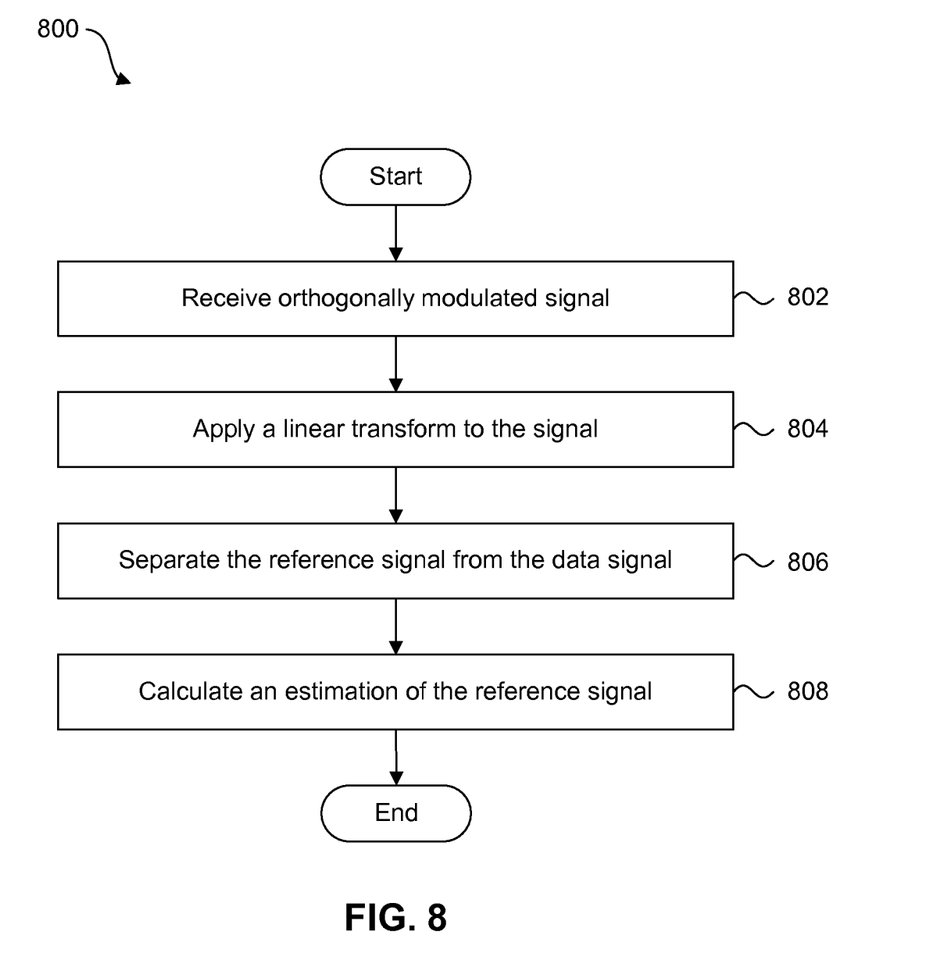
FIG. 8 is a flow diagram illustrating one embodiment of a method of receiving data signals from the transmitter.

FIG. 8 is a flow diagram illustrating one embodiment of a method 800 for receiving the combined signal 710 and separating the data signal 706 from the reference signal 708. The method 800 may be implemented by the receiver 702. The method 800 begins and the receiver 702 receives 802 an orthogonally modulated signal. In one embodiment, the signal includes the combined signal 710 as previously explained. The method 800 continues and a linear transform is applied 804 to the combined signal 710. In one embodiment the linear transform includes a matrix multiplication operation. Once the linear transform is applied 804 to the combined signal 710, the reference signal 708 is separated 806 from the data signal 706. After separation of the signals, the method 800 continues and an estimation of the reference signal 706 is calculated 808. Further details about combining and separating the data signal 706 and the reference signal 708 are provided below.

Figure 9:
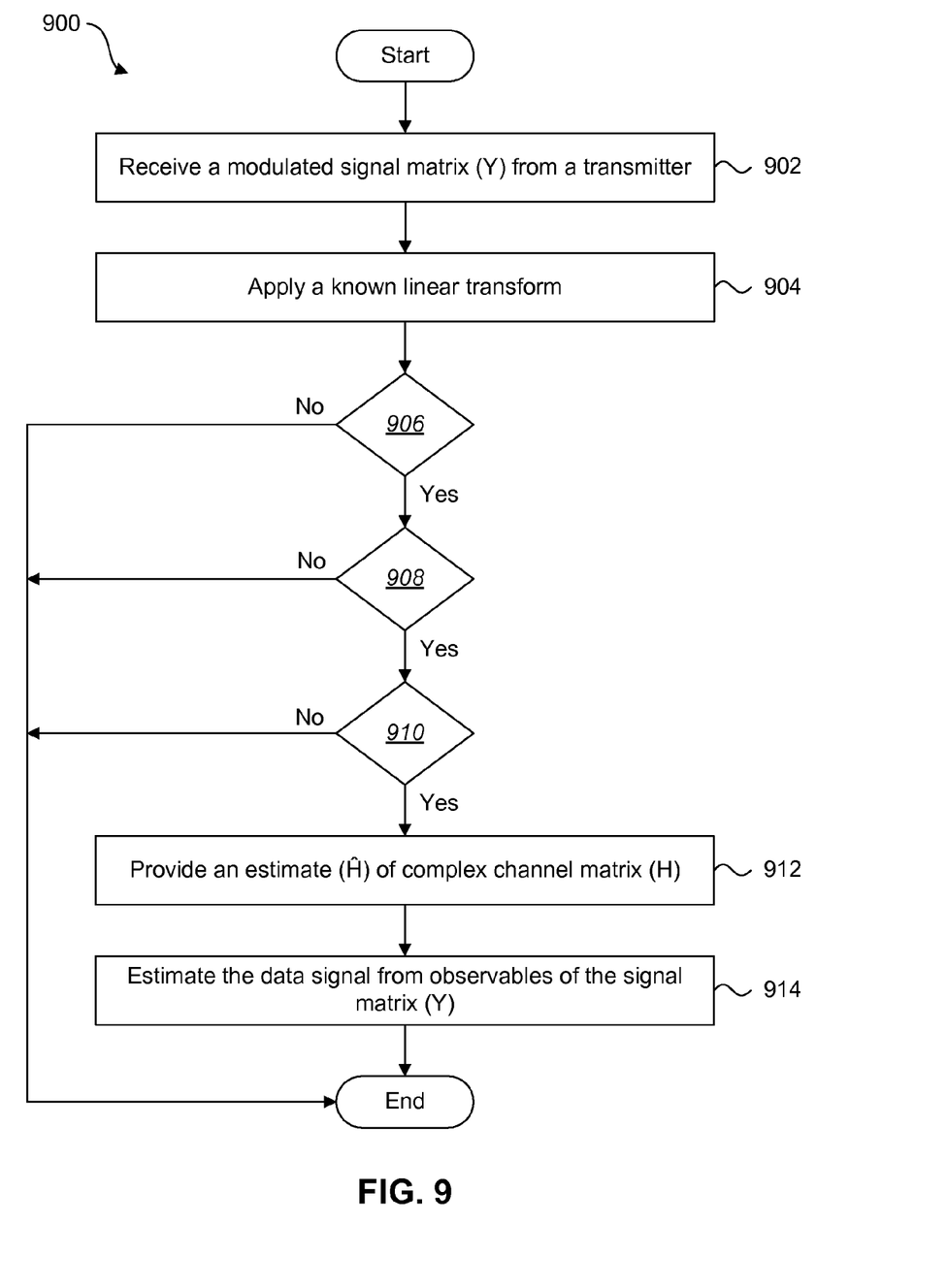
FIG. 9 is a flow diagram illustrating a further embodiment of receiving data signals from the transmitter.

FIG. 9 is a flow diagram illustrating one embodiment of a method 900 for separating reference signals from data signals. In one embodiment, the method 900 may be implemented in a flat-fading model over a period of n symbols. The following notation may be employed for the discussion pertaining to the method 900.

A matrix written as $B_{n \ldots m, i \ldots j}$ indicates the n-th through m-th rows and i-th through j-th columns of the (larger) matrix B. Let $Y=[y(t_1)\ y(t_2) \ldots y(t_n)]$ be the $m_R \times n$, received signal matrix, for time samples $\{t_1, \ldots t_n\}$, $X^{(p)}=[x^{(p)}(t_1)\ x^{(p)}(t_2) \ldots x^{(p)}(t_n)]$, $m_T \times n$, reference signal matrix, and $X_{1 \ldots m_T, 1 \ldots (n-m_T)}{}^{(d)}=[x^{(d)}(t_1) x^{(d)}(t_2) \ldots x^{(d)}(t_{(n-m_T)})]$, be the $m_T \times n-m_T$ data matrix. V may include an $m_T \times m_T$ matrix to be determined. As such, $X^{(d)}=[x^{(d)}(t_1) x^{(d)}(t_2) \ldots x^{(d)}(t_{(n-m_T)}) V]$, because V may be chosen to be a deterministic function of the data, and the a priori known reference signals. In addition, any column of $X^{(d)}$ as well as $X^{(p)}$ may include unit norm; that is, the sum of the squares of its magnitude may be unity. Further, additive noise may be expressed as $W=[w(t_1)w(t_2) \ldots w(t_n)]$, which may include an additive noise vector. The additive noise may be white, complex, circularly symmetric distributed noise, with unit variance and with independent components at each antenna of a receiver.

The method 900 starts and a modulated signal may be received 902. The received signal may be a signal matrix. In matrix notation, over $t_1$ to $t_n$, the received signal may be expressed as:

$$Y = H\left[\sqrt{\frac{\rho_p}{m_T}} X^{(p)} + \sqrt{\frac{\rho_d}{m_T}} X^{(d)}\right] + W \quad (3)$$

Here $\rho_p$ and $\rho_d$ may be the SNR for reference signals (training) and data signals respectively. The method 900 may be implemented to use the reference signals to provide an estimate $\hat{H}$ of H by using a conditional mean of equation (3) and equation (15) (provided below) based on the observables Y. This may be achieved by applying 904 a known linear transform at the receiver. Applying 904 the linear transform may imply that at the receiver, $\hat{H}=YA$ is performed.

In order for $\hat{H}=YA$, conditions may be required to be satisfied. The method 900 continues and determines 906 if the following condition is satisfied:

$$A=(X^{(p)})^H \quad (4)$$

If the method 900 determines 906 that equation (4) is not met, the method 900 ends. Regarding equation (4), $(\ )^H$ may denote a conjugate transpose. In one embodiment, the condition in equation (4) may be satisfied if the rows of $X^{(p)}$ are orthogonal to each other.

If the method 900 determines that the condition 906 is satisfied, the method 900 continues and determines 908 if the following condition is satisfied:

$$X^{(d)}A=X^{(d)}(X^{(p)})^H=0_{1 \ldots m_R, 1 \ldots m_T} \quad (5)$$

If the condition expressed in equation (5) is not met, the method 900 ends. In one embodiment, equation (5) may imply $[x^{(d)}(t_1)x^{(d)}(t_2) \ldots x^{(d)}(t_{(n-m_T)})\ V](X^{(p)})^H=0_{1 \ldots m_R, 1 \ldots m_T}$ which may also imply that with $F=(X^{(p)})^H{}_{n-(m_T-1) \ldots n, 1 \ldots m_T}$, and $G=(X^{(p)})^H{}_{1 \ldots (n-m_T), 1 \ldots m_T}$, then $VF=X_{1 \ldots m_T, 1 \ldots (n-m_T)}{}^{(d)} G$, and therefore:

$$V=-X_{1 \ldots m_T, 1 \ldots (n-m_T)}{}^{(d)} G F^{-1} \quad (5a)$$

If the method 900 determines 908 the condition in equation (5) is satisfied, the method 900 continues and determines 910 if the following condition is also satisfied:

$$F=(X^{(p)})^H{}_{n-(m_T-1) \ldots n, 1 \ldots m_T} \quad (6)$$

The condition in equation (6) may be satisfied if equation (6) has full rank ($m_T$). If the condition of equation (6) is satisfied, the method 900 continues and provides 912 and estimate $\hat{H}$ of H. The method 900 further continues and estimates 914 the data signal (multiplied by the matrix A) from the observables with the reference signal cancelled. In other words: $A\hat{X}^{(d)}=Y-\hat{H}X^{(p)}$. In one embodiment, the structure of $X^{(p)}$ is such that not only are the rows $x_i^{(p)}(t)$ orthogonal to each other, but also the subsets of rows $[x_i^{(p)}(t_1) \ldots x_i^{(p)}(t_{n-m_T})]$ are orthogonal to each other, as are the rows of $X^{(p)}{}_{n-(m_T-1) \ldots n, 1 \ldots m_T}$. In particular, this may imply $F^1 = C\ 1_{1 \ldots M_T, 1 \ldots m_T}$, where $1_{1 \ldots m_T, 1 \ldots m}$ denotes an identity matrix of $m_T$ rows and $m_T$ columns.

The method 900 may be implemented utilizing time division multiple access (TDMA) reference signals. With TDMA reference signals, $F=I_{1 \ldots m_T, 1 \ldots m_T}$, and $G=0_{1 \ldots (n-m_T), 1 \ldots m_T}$. The results of equation (3) may apply, namely the optimal energy (with unconstrained power) and so forth.

In addition, the method 900 may be implemented utilizing Walsh function reference signals. As an example, n=64, $m_T=m_R=4$. $W(k,n)$ may be denoted as Walsh code k in an n-length Walsh matrix. This may imply the k-th row of $H(\log_2(n))$ of the Hadamard matrix, where $n=2^m$. In this example, $\tilde{H}$ is not the channel matrix H referred to above. In one embodiment, the last rows of the Hadamard matrix (64×64) may be used as the reference signal sequences. These signals may be scaled because the terms relating to the data and reference signal energy have not yet been expressed. From the above definitions, $F=(X^{(p)})^H{}_{n-(m_T-1) \ldots n, 1 \ldots m_T}$ is invertible (it is the last 4 rows and columns of $\tilde{H}$ (8)) when normalized:

$$F = C\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

where C scales according to the pilot power. In addition, the optimal energy may be applied to the pilot power (over all n=64 symbols).

As previously explained above, the reference and data signals may be combined orthogonally. In other words, a pilot signal (and multiple pilot reference signals in the case of MIMO systems) may be sent contemporaneously with data signals if that channel statistics are relatively constant over a multiplicity of symbol periods. As previously explained, this may be achieved by performing a linear transformation on blocks of data (which may correspond to data from successive time samples or from successive antennas or both). The linear transformation may project the data into a "null space" of the reference signal(s). The linear transformation may be that which minimizes peak-to-average power (PAPR) and may be found at least via a numerical optimization method restricted to a class of matrices whose columns are orthogonal to the reference signals. The following illustrates an example of implementing such a method known as the Gram-Schmidt method. The Gram-Schmidt method may serve to combine the data and reference signals orthogonally.

The equations ((4)-(6)) may still include higher PAPR than desired. For example, if $x_i^d(t)$ is the i-th row of $[x^{(d)}(t_1) x^{(d)}(t_2) \ldots x^{(d)}(t_{(n-m_T)})]$, then the least upper bound for any entry in V would be given by $\|V\|_\infty \leq C < x_i^{(d)}(t)$, $$x_i^{(d)}(t) >= C \sum_{k=1}^{n} x_i^{(d)}(t_k) x_i^{(d)*}(t_k) = Cn,$$

where C is a constant based on the transmitted energies of the pilot and data. In one embodiment, reference symbols that align precisely with data symbols might not be used; e.g., if a designer were using quadrature phase-shift keying (QPSK) as a data modulation, the designer may choose reference signals with constellation points between the data constellation points so that an additional 3 dB of decorrelation might be gained.

The correlation may be "amortized" over the entries of each of the rows by rotating the vectors $x_i^d(t)$ according to the Gram-Schmitt procedure in equation (7) (shown below). In order to obtain the correct form of the solution, a different notation may be utilized such as:

$$\left\| x_k^{(p)}(t_1) \ldots x_k^{(p)}(t_{(n-m_T)}) \right\|_2 = \sqrt{\sum_{j=1}^{n-m_T} \left| x_k^{(p)}(t_j) \right|^2} = \alpha, \quad (7)$$

as well as:

$$\left\| x_k^{(p)}(t_{(n-m_T+1)}) \ldots x_k^{(p)}(t_n) \right\|_2 = 1 - \alpha \quad (8)$$

so that:

$$\left\| x_k^{(p)}(t_1) \ldots x_k^{(p)}(t_n) \right\|_2 = 1. \quad (8a)$$

It may also be assumed that:

$$\| x_k^{(d)}(t_1) \ldots x_k^{(d)}(t_{(n-m_T)}) \|_2 = 1. \quad (9)$$

Utilizing the notation used previously, but with signal energies included, the received signal Y may be expressed as:

$$Y = H \left[ \sqrt{\frac{\rho_p}{m_T}} X^{(p)} + \sqrt{\frac{\rho_d}{m_T}} X^{(d)} \right] + W. \quad (10)$$

As before, $\rho_p$ and $\rho_d$ may be the SNRs for training and data respectively.

However, instead of transmitting $$\sqrt{\frac{\rho_d}{m_T}} X^{(d)}_{1 \ldots m_T, 1 \ldots (n-m_T)},$$

the following is transmitted instead:

$$\sqrt{\frac{\rho_d}{m_T}} Z^{(d)}$$

instead, where any row $[z_i(t_1) \ldots z_i(t_{(n-m_T)})]$ is given by, with $\beta$ a known constant such that $0 \leq \beta \leq 1$, and using the Gram-Schmidt procedure:

$$z_i = x_i^{(d)}(t) - \beta \sum_{k=1}^{m_T} x_k^{(p)}(t) \frac{1}{\| x_k^{(p)}(t) \|} \sum_{j=1}^{n-m_T} x_i^{(d)}(t_j) x_k^{(p)*}(t_j). \quad (11)$$

This may be expressed in a more convenient matrix form as:

$$Z^{(d)} = X_{1 \ldots m_T, 1 \ldots (n-m_T)}^{(d)} - \beta \Gamma X_{1 \ldots m_T, 1 \ldots (n-m_T)}^{(p)} \quad (12)$$

Where the i-th row and j-th column entry of $\Gamma$ is given by:

$$g_{ij} = \frac{1}{\| x_k^{(p)}(t) \|} \sum_{j=1}^{n-m_T} x_i^{(d)}(t_j) x_k^{(p)*}(t_j). \quad (13)$$

The last term (multiplied by $$\sqrt{\frac{\rho_d}{m_T}}$$

and scaled by $\beta$) may represent the correlation between $x_i(t)$ and each of the signals in $X_{1 \ldots m_T, 1 \ldots (n-m_T)}^{(p)}$. Then, instead of transmitting $V = -X_{1 \ldots m_T, 1 \ldots (n-m_T)}^{(d)} G F^{-1}$, the following may be transmitted instead:

$$V = -\sqrt{\frac{\rho_d}{m_T}} Z^{(d)}_{1 \ldots m_T, 1 \ldots (n-m_T)} G F^{-1} \quad (14)$$

$$= -(1-\beta) \sqrt{\frac{\rho_d}{m_T}} X^{(d)}_{1 \ldots m_T, 1 \ldots (n-m_T)} G F^{-1}. \quad (15)$$

Here, $G = (X^{(p)})^H_{1 \ldots (n-m_T), 1 \ldots m_T}$, and $F = (X^{(p)})^H_{n-(m_T-1) \ldots n, 1 \ldots m_T}$ as illustrated previously. At the receiver side, it may be verified that by multiplying Y with $(X^{(p)})^H$ yields:

$$Y(X^{(p)})^H = \left( H \left[ \sqrt{\frac{\rho_p}{m_T}} X^{(p)} + \sqrt{\frac{\rho_d}{m_T}} [Z^{(d)} V] \right] + W \right) (X^{(p)})^H \quad (16)$$

so that:

$$E(Y(X^{(p)})^H) = E\left( \left( H \left[ \sqrt{\frac{\rho_p}{m_T}} X^{(p)} + \sqrt{\frac{\rho_d}{m_T}} [Z^{(d)} V] \right] + W \right)(X^{(p)})^H \right) \quad (17)$$

$$= \sqrt{\frac{\rho_p}{m_T}} H + H \sqrt{\frac{\rho_d}{m_T}} [Z^{(d)} V](X^{(p)})^H \quad (18)$$

-continued $$\text{But since } \sqrt{\frac{\rho_d}{m_T}} [Z^{(d)}V](X^{(p)})^H = \quad (19)$$

$$\sqrt{\frac{\rho_d}{m_T}} [X^{(d)}_{1...m_T,1...(n-m_T)} - \beta \Gamma X^{(p)}_{1...m_T,1...(n-m_T)}]$$

$$(X^{(p)})^H_{1...(n-m_T),1...m_T}, -(1-\beta)\sqrt{\frac{\rho_d}{m_T}} X^{(d)}_{1...m_T,1...(n-m_T)}G,$$

$$X^{(d)}_{1...m_T,1...(n-m_T)}(X^{(p)})^H_{1...(n-m_T),1...m_T} = \alpha\Gamma \text{ the following any exist:}$$

$$\sqrt{\frac{\rho_d}{m_T}} [Z^{(d)}V](X^{(p)})^H = 0 \quad (20)$$

In addition, the V matrix may also represent an important part in reconstituting the original data matrix $X_{1 \ldots m_T, 1 \ldots (n-m_T)}^{(d)}$; since $F^{-1}$ is known, $$VF = -(1-\beta)\sqrt{\frac{\rho_d}{m_T}} X^{(d)}_{1...m_T,1...(n-m_T)}G = -\alpha(1-\beta)\sqrt{\frac{\rho_d}{m_T}} \Gamma \quad (21)$$

and, therefore, reception of V allows the reconstruction of the original data sequence $X_{1 \ldots m_T, 1 \ldots (n-m_T)}^{(d)}$.

Also, by choosing β½, and by performing the Gram-Schmidt procedure as outlined above, an additional reduction in peak value of the V matrix of 3 dB may be gained. Reconstruction of the original data constellation at the receiver side may be obtained by the use of the transmitted matrix V, and the fact that the pilot signals are known to the receiver.

Figure 10:
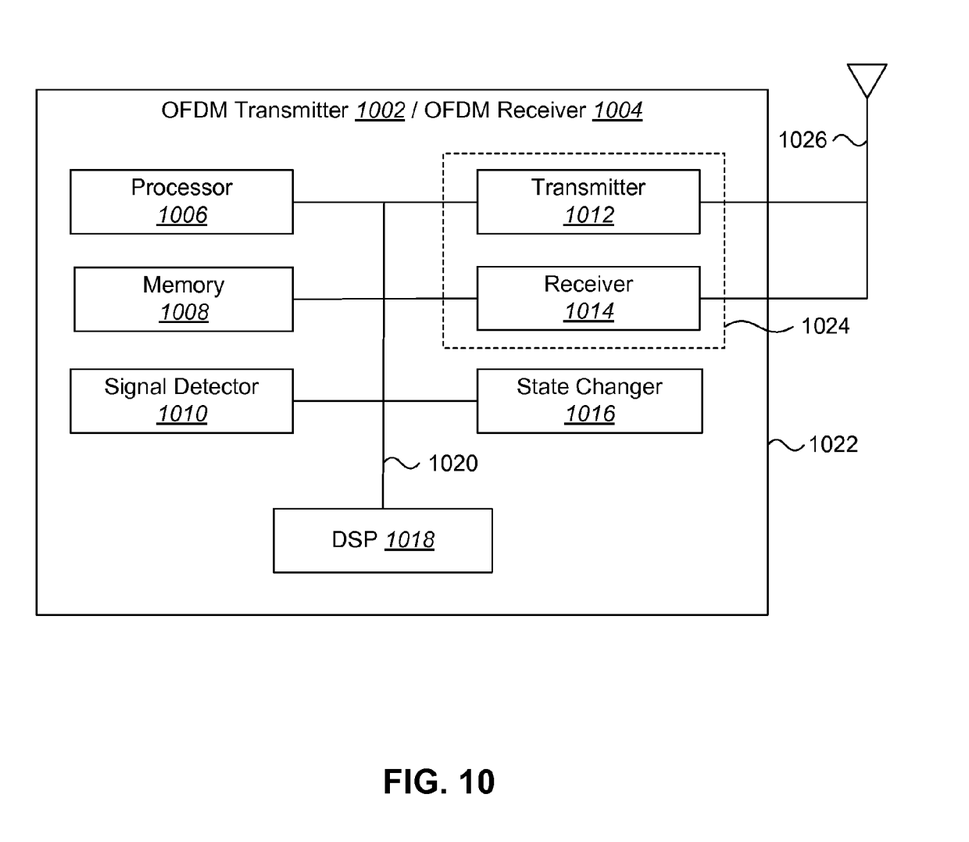
FIG. 10 illustrates various components that may be utilized in an OFDM transmitter and/or an OFDM receiver.

FIG. 10 illustrates various components that may be utilized in an OFDM transmitter 1002 and/or an OFDM receiver 1004. The OFDM transmitter 1002 and/or OFDM receiver 1004 includes a processor 1006 which controls operation of the OFDM transmitter 1002 and/or OFDM receiver 1004. The processor 1006 may also be referred to as a CPU. Memory 1008, which may include both read-only memory (ROM) and random access memory (RAM), provides instructions and data to the processor 1006. A portion of the memory 1008 may also include non-volatile random access memory (NVRAM).

The OFDM transmitter 1002 and/or OFDM receiver 1004 may also include a housing 1022 that contains a transmitter 1012 and a receiver 1014 to allow transmission and reception of data. The transmitter 1012 and receiver 1014 may be combined into a transceiver 1024. An antenna 1026 is attached to the housing 1022 and electrically coupled to the transceiver 1012. Additional antennas (not shown) may also be used.

The OFDM transmitter 1002 and/or OFDM receiver 1004 may also include a signal detector 1010 used to detect and quantify the level of signals received by the transceiver 1024. The signal detector 1010 detects such signals as total energy, pilot energy, power spectral density, and other signals.

A state changer 1016 controls the state of the OFDM transmitter 1002 and/or OFDM receiver 1004 based on a current state and additional signals received by the transceiver 1024 and detected by the signal detector 1010. The OFDM transmitter 1002 and/or OFDM receiver 1004 may be capable of operating in any one of a number of states.

The various components of the OFDM transmitter 1002 and/or OFDM receiver 1004 are coupled together by a bus system 1020 which may include a power bus, a control signal bus, and a status signal bus in addition to a data bus. However, for the sake of clarity, the various buses are illustrated in FIG. 10 as the bus system 1020. The OFDM transmitter 1002 and/or OFDM receiver 1004 may also include a digital signal processor (DSP) 1018 for use in processing signals. One skilled in the art will appreciate that the OFDM transmitter 1002 and/or OFDM receiver 1004 illustrated in FIG. 10 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for combining a reference signal with a data signal, the method being implemented by a communications system, the method comprising:
   receiving a multiplexed data signal;
   applying a demultiplexer to the data signal;
   encoding the data signal;
   applying a linear transform to the data signal which projects the data signal into a null-space of a plurality of reference signals, wherein the linear transform minimizes a peak-to-average power ratio (PAPR);
   summing the encoded data signal with the reference signal;
   modulating orthogonally the summation of the data signal and the reference signal; and
   transmitting the combined reference signal and data signal to a receiver.

2. The method of claim 1, further comprising selecting the reference signal based on a solution of a constrained optimization problem.

3. The method of claim 1, further comprising transmitting the combined signal with a single antenna.

4. The method of claim 1, further comprising transmitting the combined signal with a multiple-input multiple-output antenna system.

5. The method of claim 1, further comprising approximating the optimal reference signal by optimizing over a particular class of matrices that multiplex the data signal and reference signal into each other.

6. The method of claim 1, further comprising preserving the transmitted average power required to maintain the same symbol error characteristics.

7. The method of claim 1, further comprising estimating the reference signal.

8. The method of claim 1, further comprising demodulating the data signal.

9. The method of claim 1, further comprising a class of receivers.

10. The method of claim 1, wherein the method is implemented for orthogonal frequency-division multiplexing (OFDM).

11. The method of claim 1, wherein the method is implemented for discrete Fourier transform (DFT)-Spread OFDM.

12. The method of claim 1, wherein the method is implemented for a multi carrier system.

13. The method of claim 1, further comprising aggregating the reference signal amongst multiple carriers.

14. The method of claim 1, further comprising employing tone reservation in the multiple carrier system.

15. A communications system that is configured to implement a method for combining a reference signal with a data signal, the communications system comprising:
   a processor;
   memory in electronic communication with the processor;
   instructions stored in the memory, the instructions being executable for:
   receiving a multiplexed data signal;
   applying a demultiplexer to the data signal;
   encoding the data signal;
   applying a linear transform to the data signal which projects the data signal into a null-space of a plurality of reference signals, wherein the linear transform minimizes a peak-to-average power ratio (PAPR);
   summing the encoded data signal with the reference signal;
   modulating orthogonally the summation of the data signal and the reference signal; and
   transmitting the combined reference signal and data signal to a receiver.

16. The system of claim 15, further comprising the reference signal based on a solution of a constrained optimization problem.

17. The system of claim 15, further comprising the combined signal being transmitted by a single antenna.

18. The system of claim 15, further comprising the combined signal being transmitted by multiple antennas.

19. A computer-readable medium comprising executable instructions for implementing a method for combining a reference signal with a data signal, the method comprising:
   receiving a multiplexed data signal;
   applying a demultiplexer to the data signal;
   encoding the data signal;
   applying a linear transform to the data signal which projects the data signal into a null-space of a plurality of reference signals, wherein the linear transform minimizes a peak-to-average power ratio (PAPR);
   summing the encoded data signal with the reference signal;
   modulating orthogonally the summation of the data signal and the reference signal; and
   transmitting the combined reference signal and data signal to a receiver.

20. The computer-readable medium of claim 19, further comprising choosing the reference signal based on a solution of a constrained optimization problem.

21. A method for receiving a combined reference and data signal, the method being implemented by a communications system, the method comprising:
   receiving the combined reference and data signal, wherein the data signal has been projected into a null-space of a plurality of reference signals, and wherein a linear transformation that minimizes peak-to-average power ratio (PAPR) has been applied to the data signal;
   demodulating a summation of the combined reference and data signal;
   applying a linear transform to the combined signal;
   separating the reference signal from the data signal; and
   calculating an estimation of the reference signal.

* * * * *